US008528618B2

(12) United States Patent
Kisch et al.

(10) Patent No.: US 8,528,618 B2
(45) Date of Patent: Sep. 10, 2013

(54) BACKING FILM REMOVAL FOR FIBER PLACEMENT MACHINE

(75) Inventors: Robert A. Kisch, Auburn, WA (US); Kyle Jeffries, Everett, WA (US); Dustin Schmidt, Seattle, WA (US); Peter Vogeli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/226,295

(22) Filed: Sep. 6, 2011

(65) Prior Publication Data

US 2011/0315325 A1    Dec. 29, 2011

Related U.S. Application Data

(62) Division of application No. 11/609,285, filed on Dec. 11, 2006, now Pat. No. 8,012,291.

(51) Int. Cl.
*B65H 37/00* (2006.01)
*B32B 38/10* (2006.01)

(52) U.S. Cl.
USPC ........... 156/540; 156/247; 156/249; 156/759; 156/767

(58) Field of Classification Search
USPC ................ 156/323, 344, 540, 584, 247, 249, 156/759, 767; 226/5, 109
IPC ........................................................ B29C 70/38
See application file for complete search history.

(56) References Cited

U.S. PATENT DOCUMENTS

| 3,775,219 | A | * | 11/1973 | Karlson et al. | 156/363 |
| 3,977,588 | A | * | 8/1976 | Meade et al. | 226/168 |
| 4,407,688 | A | * | 10/1983 | Mussi et al. | 156/242 |
| 4,557,790 | A | * | 12/1985 | Wisbey | 156/511 |
| 4,699,683 | A | * | 10/1987 | McCowin | 156/353 |
| 4,842,684 | A | * | 6/1989 | Tillement et al. | 156/538 |
| 4,891,090 | A | * | 1/1990 | Lorincz et al. | 156/577 |
| 4,997,513 | A | * | 3/1991 | Lengen et al. | 156/523 |
| 5,863,384 | A | * | 1/1999 | Reddy | 156/576 |
| 6,286,403 | B1 | * | 9/2001 | Rosenthal et al. | 83/215 |
| 6,968,883 | B2 | * | 11/2005 | Torres Martinez | 156/433 |
| 7,063,118 | B2 | | 6/2006 | Hauber et al. | |
| 7,282,107 | B2 | | 10/2007 | Johnson et al. | |
| 7,472,736 | B2 | | 1/2009 | Kisch et al. | |
| 8,012,291 | B2 | * | 9/2011 | Kisch et al. | 156/247 |
| 2005/0039843 | A1 | * | 2/2005 | Johnson et al. | 156/175 |
| 2005/0109451 | A1 | * | 5/2005 | Hauber et al. | 156/250 |
| 2006/0180264 | A1 | * | 8/2006 | Kisch et al. | 156/173 |
| 2008/0135174 | A1 | * | 6/2008 | Kisch et al. | 156/344 |

FOREIGN PATENT DOCUMENTS

EP    0255425 A1    2/1988
WO    2008073191 A1    6/2008

OTHER PUBLICATIONS

PCT Search Report with Written Opinion dated May 8, 2008 regarding international application No. PCT/US2007/023039, applicant The Boeing Company, 7 pages.
USPTO Requirement for Restriction dated Dec. 17, 2009 for U.S. Appl. No. 11/609,285, 6 pages.

(Continued)

*Primary Examiner* — William Bell
(74) *Attorney, Agent, or Firm* — Yee & Associates, P.C.

(57) ABSTRACT

An apparatus and associated method for removing backing film from tape during a fiber placement process. A passive (non-powered) take-up roller is used to wind up the backing film that has been separated from the tape.

19 Claims, 3 Drawing Sheets

(56) References Cited

OTHER PUBLICATIONS

Repsonse to Restriction Requirement dated Jan. 14, 2010 for U.S. Appl. No. 11/609,285, 4 pages.
USPTO Office Action dated Mar. 3, 2010 for U.S. Appl. No. 11/609,285, 9 pages.
Response to Office Action dated May 12, 2010 for U.S. Appl. No. 11/609,285, 12 pages.
USPTO Final Office Action dated Jul. 20, 2010 for U.S. Appl. No. 11/609,285, 11 pages.
Amendment submitted with RCE dated Oct. 19, 2010 for U.S. Appl. No. 11/609,285, 7 pages.
USPTO Notice of Allowance dated May 4, 2011 for U.S. Appl. No. 11/609,285, 7 pages.

* cited by examiner

BACKING FILM REMOVAL FOR FIBER PLACEMENT MACHINE

This application is a divisional of U.S. patent application Ser. No. 11/609,285 filed Dec. 11, 2006, now U.S. Pat. No. 8,012,291, the disclosure of which is incorporated herein by reference.

FIELD

The present invention generally relates to a lamination device, and more particularly, to a system and method of fabricating a composite item.

BACKGROUND

Composite items are typically constructed from layers of material that are laminated together. The categories of materials used to fabricate or "layup" composite items includes, for example: fiber; fabric; tape; film; and foil. When these items are arranged as woven sheets and unidirectional ribbons, for example, they are referred to as fabric and tape, respectively.

Fiber placement machines that apply tape require removal of a polyethylene backing film prior to lamination. Current systems depend on vacuum and/or compressed air to remove the backing film but are generally not reliable. Unreliable systems may cause excessive machine downtime and lower throughput.

What is needed is an apparatus and associated method for removing backing film from tape during the fiber placement process that is reliable and may be passive.

SUMMARY OF THE INVENTION

The present invention provides an apparatus and associated method for removing backing film from tape during the fiber placement process. The present invention uses a passive (non-powered) take-up roller to wind up the backing film that has been separated from the tape.

In one aspect of the present invention, a method is provided for removing backing film from a roll of tape, such as slit prepreg tape, used for tape laying or fiber placement. The method includes unwinding the tape from a roll using a first roller while the backing is attached; partially removing the backing film from the tape and attaching the backing film to a second, take-up roller that is free to rotate; continuing to unwind the tape, partially wrapping it around the second, freely rotating take-up roller such that the tape drives the take-up roller as the tape laying or fiber placement proceeds.

In another aspect, the present invention provides an apparatus for removing backing film from a roll of tape used for tape laying or fiber placement. The invention includes a tape roller and backing film take-up roller, where the take-up roller has an axis which is parallel to a spool of tape. The take-up roller having the capacity to accept the entire length of backing film from the spool of tape as the tape unwinds from the spool, but before the tape enters a dispensing and compaction system. The take-up roller is driven by the tape as the tape is drawn by the tape roller from the spool on its way to the dispensing and compaction system.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of various objects of the present invention. The illustrated embodiment is intended to illustrate, but not to limit the invention. The drawings include the following.

DETAILED DESCRIPTION

Figure 1:
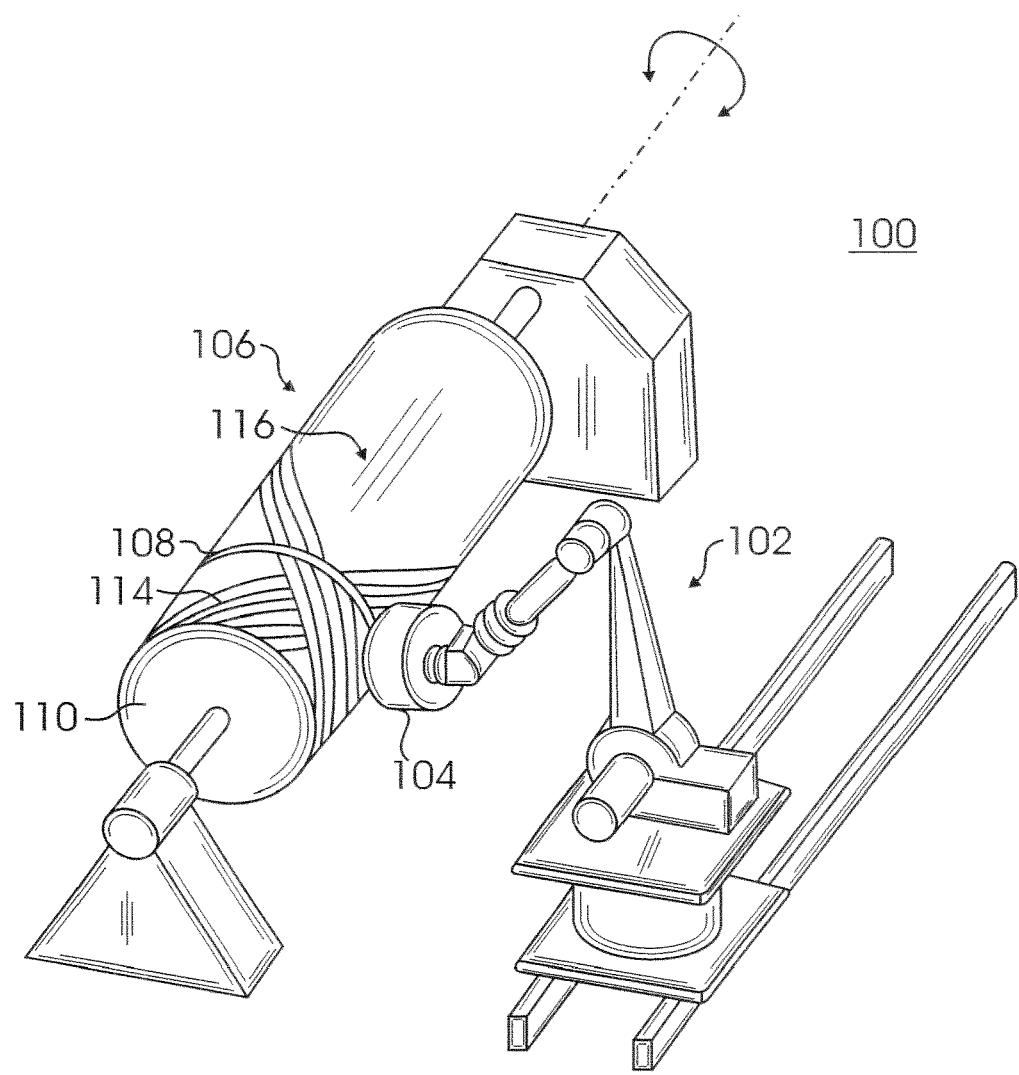
FIG. 1 is a simplified perspective view of an automated lamination device according to an embodiment of the invention.

FIG. 1 is a perspective view of a laminating device 100 according to an embodiment of the invention. In one embodiment, laminating device 100 includes a positioning device 102 and an end effector 104. Positioning device 102 is configured to position or otherwise control the movement of end effector 104. In one embodiment, positioning device 102 may be a robotic armature or gantry-type positioning device configured to control three to ten or more axes of movement.

Laminating device 102 is configured to fabricate an item 106 by applying a course material 108 on a form 110. Typically, item 106 is fabricated from multiple plies or layers of course material 108. In one embodiment, end effector 104 includes a compaction roller 218 (FIG. 2) and/or sweep to apply course material 108 to form 110. Form 110 may be configured to provide a suitably stable and finished surface for ply placement.

As shown in FIG. 1, form 110 is controlled to rotate about an axis. When controlled to rotate, form 110 is typically referred to as a mandrel. In other embodiments, form 110 may be stationary or controlled to move in various axes. For example, form 110 may be secured to a sliding table or X-Y table.

Item 106 is shown in FIG. 1 being constructed from a plurality of courses 114. Each layer of courses 114 that is placed upon form 110 or a substrate 116 is described as a ply and item 106 is typically fabricated from a plurality of plies. Substrate 116 includes form 110 surface and/or a previously applied course 114.

A laminating device is disclosed in U.S. Pat. No. 7,472,736, which is incorporated herein by reference for all purposes.

Figure 2:
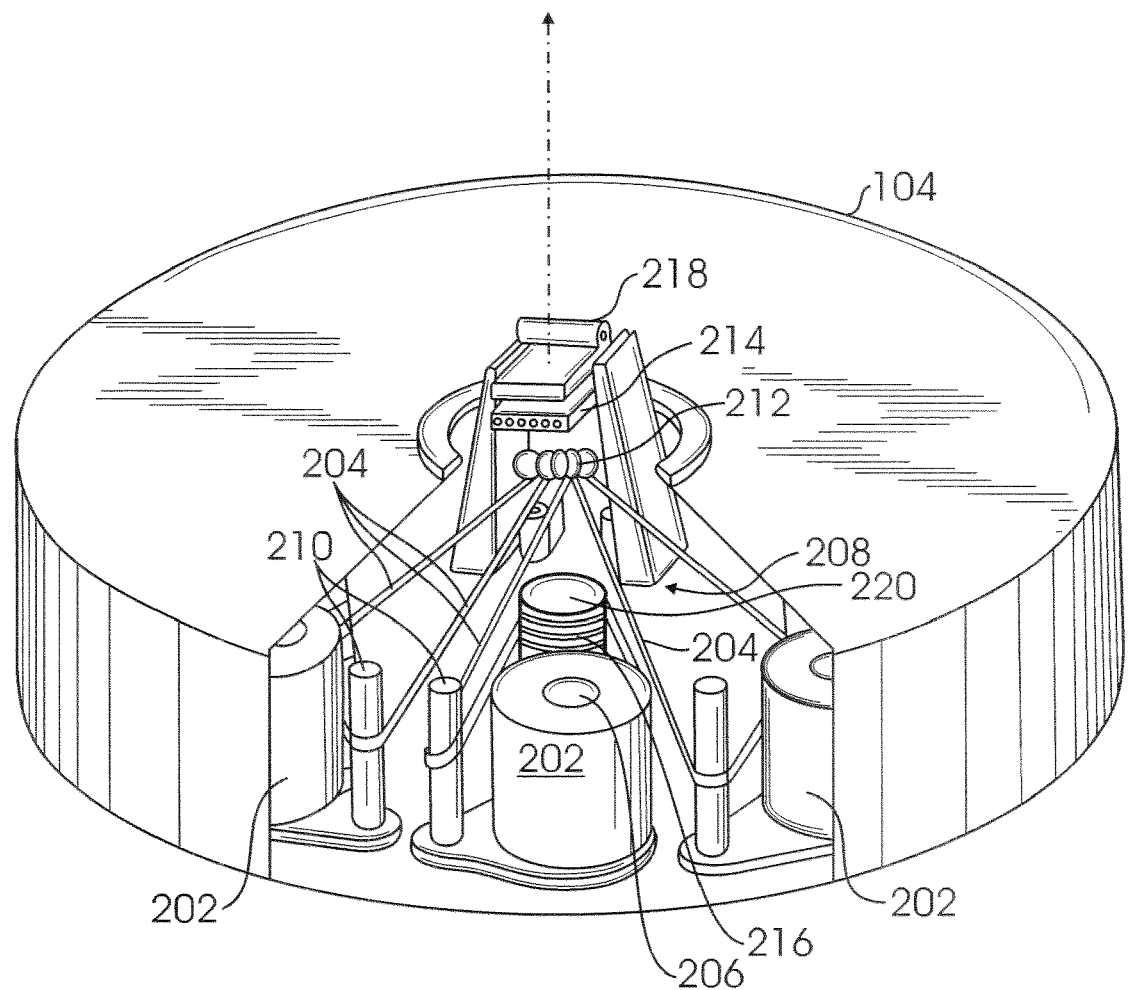
FIG. 2 is a simplified perspective view of a front of an end effector that is suitable for use with the laminating device of FIG. 1.

FIG. 2 is a perspective view of a front of end effector 104 that is suitable for use with laminating device 100. As shown in FIG. 2, end effector 104 includes a set of spools 202, a dancer roller 210, a redirecting pulley 212, a cutting assembly 214, a compaction roller 218 and a take-up roller 220.

In one embodiment, tape 204 includes backing film or separator film 216, which substantially prevents tape 204 from adhering to itself while it is on spool 202 or in roll form. Tape 204 may include any suitable course material, for example, various fibers, films, foils, and/or the like. Particular examples of fibers include glass, aramid, carbon, and various other fibers. Tape 204 includes individual fibers, bundles, cords, plaits, ribbons in the form of unidirectional "tape," woven fabric, biaxial cloth and the like. In addition, tape 204 may be pre-impregnated with a resin or other such binding substance.

Each of spools 202 is mounted on a respective spindle or tensioner 206. Tensioner 206 detachably secures the respective spool 202 to end effector 104 and includes any suitable tensioning device such as, for example, a brake or motor to tension and otherwise modulate the rate at which tape 204 is dispensed. A specific example of a suitable tensioning device includes a belt that wraps around a portion of the circumference of tensioner 206 and generates friction that retards the rotation of tensioner 206.

End effector 104 further includes a path 208 for tape 204 to follow as it travels from spool 202 to compaction roller 218. As shown in FIG. 2, tape 204 with backing 216 traverses through path 208 from spool 202 around take-up roller 220, which takes up the separated backing film 216, around dancer roller 210, which dampens rapid changes in tape feed rates, and through redirecting pulley 212, used to guide tape 204 into cutting assembly 214. According to an embodiment, dancer roller 210 and redirecting pulley 212 may be fixed in angle relative to one another. Thus, the angle at which tape 204 is introduced to redirecting pulley 212 remains substantially constant even as the radius of spool 202 decreases due to removal of tape 204. Dancer roller 210 further facilitates a smooth removal of tape 204 from spool 202 and facilitates removal of tape backing 216.

In one embodiment, take-up roller 220, may be a passive or non-powered, freely rotating take-up roll. The axis of take-up roller 220 is substantially parallel to the axis of spool 202. Take-up roller 220 has the capacity to accept the entire length of backing film 216 from spool 202 as tape 204 unwinds from spool 202.

Figure 3:
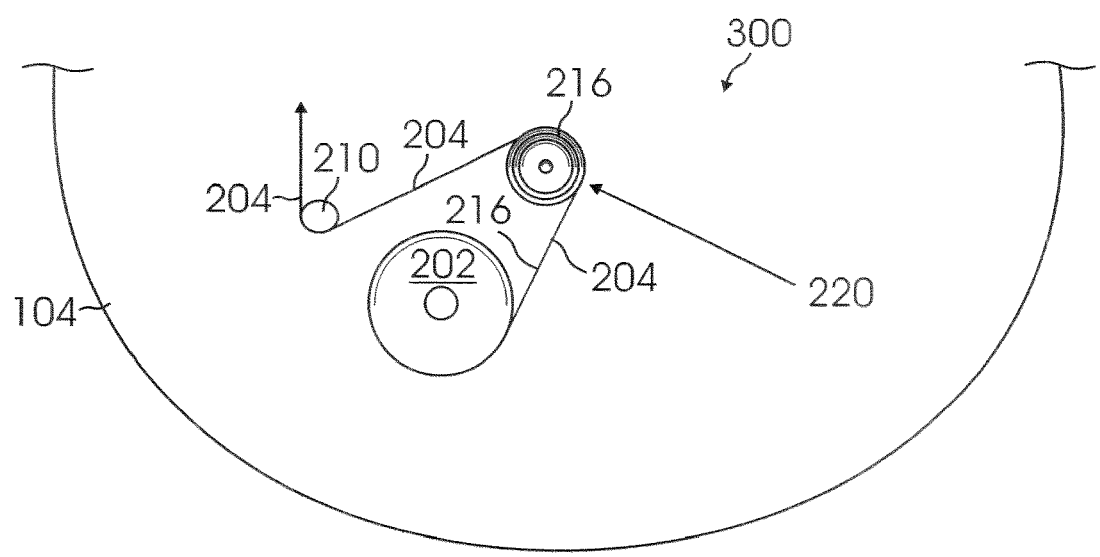
FIG. 3 is a simplified top view of a backing removal system for use with the end effector of FIG. 2 according to an embodiment of the invention.

FIG. 3 is a simplified top view of a backing removal system 300 according to an embodiment of the present invention. In one embodiment, backing removal system 300 includes spool 202, dancer roller 210 and take-up roller 220, which may be driven by tape 204 as tape 204 is drawn from spool 202 toward compaction roller 218 (FIG. 2).

In one operational embodiment, tape 204 is de-spooled with backing film 216 attached. Backing film 216 is attached to take-up roller 220, which is free to rotate. As tape 204 continues to unwind from spool 202 and traverse around take-up roller 220, backing film 216 is pulled away or separated from tape 204 and continues to wrap around take-up roller 220. Tape 204 continues to traverse path 208 after traversing take-up roller 220 with backing film 216 having been removed. In this manner, tape 204 drives take-up roller 220 as the tape laying or fiber placement proceeds.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. An apparatus, comprising:
   a first roller configured to unwind tape from a spool, the tape on the spool having a backing film attached to the tape;
   a take-up roller configured to store the backing film as the backing film is removed from the tape as the tape is moved around the take-up roller, wherein the take-up roller is a freely rotating roller driven only by movement of the tape around the take-up roller; and
   a dancer roller configured to control tension of the tape as the tape with the backing film removed is directed from the take-up roller around the dancer roller.

2. The apparatus of claim 1, wherein the tape comprises slit tape prepreg.

3. The apparatus of claim 1, wherein the first roller is a compaction roller.

4. The apparatus of claim 3, wherein the dancer roller is further configured to dampen changes in a feed rate of the tape as the tape with the backing film removed is directed from the take-up roller to the dancer roller.

5. The apparatus of claim 1, further comprising a redirecting pulley configured to guide the tape with the backing film removed from the dancer roller to the compaction roller.

6. The apparatus of claim 5, wherein the dancer roller and the redirecting pulley are fixed in angle relative to one another.

7. The apparatus of claim 1, wherein the first roller and the take-up roller comprise an end effector and wherein the end effector is attached to a positioning device.

8. An apparatus, comprising:
   a spool, a roll of tape on the spool having a backing film attached to the tape;
   a take-up roller, wherein the tape with the backing film still attached extends from the spool to the take-up roller and partially around the take-up roller and wherein the take-up roller is configured to store the backing film as the backing film is removed from the tape as the tape is moved around the take-up roller, wherein the take-up roller is a freely rotating roller driven only by movement of the tape around the take-up roller; and
   a dancer roller, wherein the tape with the backing film removed extends from the take-up roller to the dancer roller, the dancer roller configured to control tension in the tape.

9. The apparatus of claim 8, wherein the tape comprises slit tape prepreg.

10. The apparatus of claim 8, further comprising a redirecting pulley, wherein the tape with the backing film removed extends from the dancer roller to the redirecting pulley.

11. The apparatus of claim 10, wherein the dancer roller and the redirecting pulley are fixed in angle relative to one another.

12. The apparatus of claim 10, further comprising a compaction roller, wherein the tape with the backing film removed extends from the redirecting pulley to the compaction roller.

13. The apparatus of claim 8, wherein the spool and the take-up roller comprise an end effector and wherein the end effector is attached to a positioning device.

14. An end effector for applying courses of tape on a rotating mandrel, the end effector comprising:
   a plurality of spools, each of the plurality of spools having rolls of tape with backing positioned thereon;
   a plurality of take up rollers, each of the plurality of take up rollers configured to receive a course of tape with backing from a corresponding spool such that the backing unwinds from the tape onto the take up roller;
   a plurality of dancer rollers, each of the plurality of dancer roller configured to receive a course of tape from a corresponding take up roller; and
   a number of redirecting pulleys configured to receive a plurality of courses of tape from the plurality of dancer rollers and to direct the courses of tape to the rotating mandrel.

15. The end effector of claim 14, wherein the plurality of spools further comprise a plurality of tensioners connected with each spool.

16. The end effector of claim 14 further comprising a cutting assembly configured to cut the plurality of courses of tape.

17. The end effector of claim 14 further comprising a compaction roller.

18. The end effector of claim 14 further comprising a positioning device connected to the end effector.

19. The end effector of claim 14, wherein each of the plurality of take up rollers and each of the corresponding plurality of dancer rollers are positioned in a fixed angle.

\* \* \* \* \*